US009500902B2

(12) United States Patent
Chen et al.

(10) Patent No.: US 9,500,902 B2
(45) Date of Patent: Nov. 22, 2016

(54) DISPLAY DEVICE SWITCHABLE BETWEEN MIRROR MODE AND DISPLAY MODE

(71) Applicant: AU OPTRONICS CORP., Hsin-Chu (TW)

(72) Inventors: Kuei-Bai Chen, Hsin-Chu (TW); Chia-Hao Li, Hsin-Chu (TW); Chen-Hsien Liao, Hsin-Chu (TW); Chih-Ling Hsueh, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 200 days.

(21) Appl. No.: 14/285,862

(22) Filed: May 23, 2014

(65) Prior Publication Data
US 2015/0036085 A1 Feb. 5, 2015

(30) Foreign Application Priority Data

Aug. 2, 2013 (TW) .............................. 102127802 A

(51) Int. Cl.
G02F 1/1333 (2006.01)
G02F 1/1347 (2006.01)
G02F 1/1335 (2006.01)
G02F 1/137 (2006.01)

(52) U.S. Cl.
CPC ..... *G02F 1/133536* (2013.01); *G02F 1/13725* (2013.01); *G02F 2203/01* (2013.01); *G02F 2203/02* (2013.01)

(58) Field of Classification Search
None
See application file for complete search history.

(56) References Cited

U.S. PATENT DOCUMENTS 6,211,933 B1 * 4/2001 Mizunuma ........ G02F 1/133536 349/113
6,512,559 B1 * 1/2003 Hashimoto ......... G02F 1/13475 349/74
2002/0171788 A1 * 11/2002 Lin ..................... B32B 17/10 349/96
2004/0100598 A1 * 5/2004 Adachi ............. G02F 1/133536 349/113
2008/0158499 A1 * 7/2008 Lai ..................... G02F 1/133528 349/162
2013/0242212 A1 9/2013 Huang et al.
2014/0340728 A1 * 11/2014 Taheri .................. G02B 27/281 359/250

FOREIGN PATENT DOCUMENTS

| CN | 1493016 | 4/2004 |
|----|---------|--------|
| JP | 2001343671 | 12/2001 |
| JP | 2004069926 | 3/2004 |
| JP | 2006308897 | 11/2006 |
| TW | 200525464 | 8/2005 |
| TW | 200809328 | 2/2008 |
| TW | I305581 | 1/2009 |
| TW | I379109 | 12/2012 |
| TW | I382380 | 1/2013 |

* cited by examiner

Primary Examiner — Ryan Crockett
(74) Attorney, Agent, or Firm — WPAT, PC; Justin King

(57) ABSTRACT

Disclosed herein is a display device switchable between a mirror mode and a display mode. The display device includes a display panel, a polarizing element and a reflective polarizer. The display panel has a light-emitting surface for emitting a polarized light. The polarizing element has an absorption axis, and is disposed on a side adjacent to the light-emitting surface. The polarizing element is switchable between a polarizing mode and a non-polarizing mode. When the polarizing element is operated in the polarizing mode, the polarizing element absorbs a polarized light in the polarization direction parallel with the absorption axis. When the polarizing element is operated in the non-polarizing mode, the polarizing element allows the polarized light emitted from the display panel to pass there through. The reflective polarizer is disposed between the display panel and the polarizing element.

19 Claims, 8 Drawing Sheets

DISPLAY DEVICE SWITCHABLE BETWEEN MIRROR MODE AND DISPLAY MODE

RELATED APPLICATIONS

This application claims priority to Taiwan Application Serial Number 102127802, filed Aug. 2, 2013, the entirety of which is incorporated herein by reference.

BACKGROUND

Technical Field

The present disclosure relates to a display device. More particularly, the present disclosure relates to a display device which is switchable between a mirror mode and a display mode.

Description of Related Art

With the development of flat panel display application, the display with switchable mirror function is demanded. Generally, the display with switchable mirror function means a display which possesses both display function and mirror function. In the prior art, the display with mirror function is implemented by adding a reflective polarizer. For this conventional technology, the mirror image and the display image are easily interfered with each other so that the vision quality is unfavorably affected. Besides, for this conventional technology, it is not possible for the user to configure the panel to exhibit the mirror image in some regions and simultaneously to exhibit the display image in other regions. For the forgoing reasons, there is a need for an improved display panel which would solve the problem described above.

SUMMARY

One aspect of the present disclosure is to provide a display device switchable between a mirror mode and a display mode in order to improve the interference between the mirror image and the display image. Besides, the display area may be configured into plural display regions as required so that some display regions are in the mirror mode and the other display regions are in the display mode.

The display device includes a display panel, a polarizing element and a reflective polarizer. The display panel has a light-emitting surface for emitting a polarized light. The polarizing element has an absorption axis, and is disposed on a side adjacent to the light-emitting surface. The polarizing element is switchable between a polarizing mode and a non-polarizing mode. When the polarizing element is operated in the polarizing mode, the absorption axis of the polarizing element absorbs the polarized light in a polarization direction parallel with the absorption axis. When the polarizing element is operated in the non-polarizing mode, the polarizing element allows the polarized light emitted from the display panel to pass there through. The reflective polarizer is disposed between the display panel and the polarizing element.

According one embodiment of the present disclosure, when the polarizing element is operated in the polarizing mode, the display panel is in the mirror mode. When the polarizing element is operated in the non-polarizing mode, the display panel is in the display mode.

According to one embodiment of the present disclosure, the reflective polarizer has a reflection axis and a transmission axis. When the polarizing element is operated in the polarizing mode, the absorption axis of the polarizing element is substantially parallel with the transmission axis of the reflective polarizer.

According one embodiment of the present disclosure, when the polarizing element is operated in the polarizing mode, the absorption axis of the polarizing element is substantially parallel with the light-emitting surface. When the polarizing element is operated in the non-polarizing mode, the absorption axis of the polarizing element is substantially perpendicular to the light-emitting surface.

According one embodiment of the present disclosure, the polarizing element includes at least one first transparent electrode, at least one second transparent electrode and a polarizing layer. The second transparent electrode faces the first transparent electrode. The polarizing layer is disposed between the first transparent electrode and the second transparent electrode. The polarizing layer includes a liquid crystal material and a dichroic dye.

According one embodiment of the present disclosure, the polarizing element further includes a first alignment layer and a second alignment layer. The first alignment layer is disposed between the first transparent electrode and the polarizing layer. The second alignment layer is disposed between the second transparent electrode and the polarizing layer. The aligning direction of the first alignment layer is the same as that of the second alignment layer.

According to one embodiment of the present disclosure, the aligning direction is substantially parallel with the absorption axis in polarizing mode.

According to one embodiment of the present disclosure, the at least one first transparent electrode is in plurality, and each of the first transparent electrodes is separated from one another by a distance. Each of the first transparent electrodes is configured to independently provide an electrical potential.

According to one embodiment of the present disclosure, the at least one first transparent electrode is in plurality, and each of the first transparent electrodes is separated from one another. The at least one second transparent electrode is in plurality, and each of the second transparent electrodes is separated from one another. Each of the first transparent electrodes is corresponding to one of the second transparent electrodes, and each of the first transparent electrodes and the second transparent electrodes is configured to independently provide an electrical potential.

According to one embodiment of the present disclosure, the first transparent electrodes and the second transparent electrodes are configured in a way such that a portion of the polarizing element is in the polarizing mode and another portion of the polarizing element is in the non-polarizing mode.

According to one embodiment of the present disclosure, when a difference in electrical potential between the first transparent electrode and the second transparent electrode is substantially equal to zero, the polarizing element is in the polarizing mode.

According to one embodiment of the present disclosure, when a difference in electrical potential between the first transparent electrode and the second transparent electrode is not equal to about zero, the polarizing element is in the non-polarizing mode.

According to one embodiment of the present disclosure, the dichroic dye has a long axis, and the long axis is substantially parallel with the absorption axis when the polarizing element is in the polarizing mode.

According to one embodiment of the present disclosure, the dichroic dye has a long axis, and the long axis is substantially perpendicular to the first transparent electrode when the polarizing element is in the non-polarizing mode.

According to one embodiment of the present disclosure, the polarizing layer has a thickness of about 2.5 micrometer to about 12 micrometer, and preferably about 5 micrometer to about 10 micrometer.

According to one embodiment of the present disclosure, the weight percentage of the dichroic dye in the polarizing layer is from about 0.2% to about 3%, preferably from about 0.5% to about 2.9%.

It is to be understood that both the foregoing general description and the following detailed description are by examples, and are intended to provide further explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. In the drawings.

DESCRIPTION OF THE EMBODIMENTS

Figure 1:
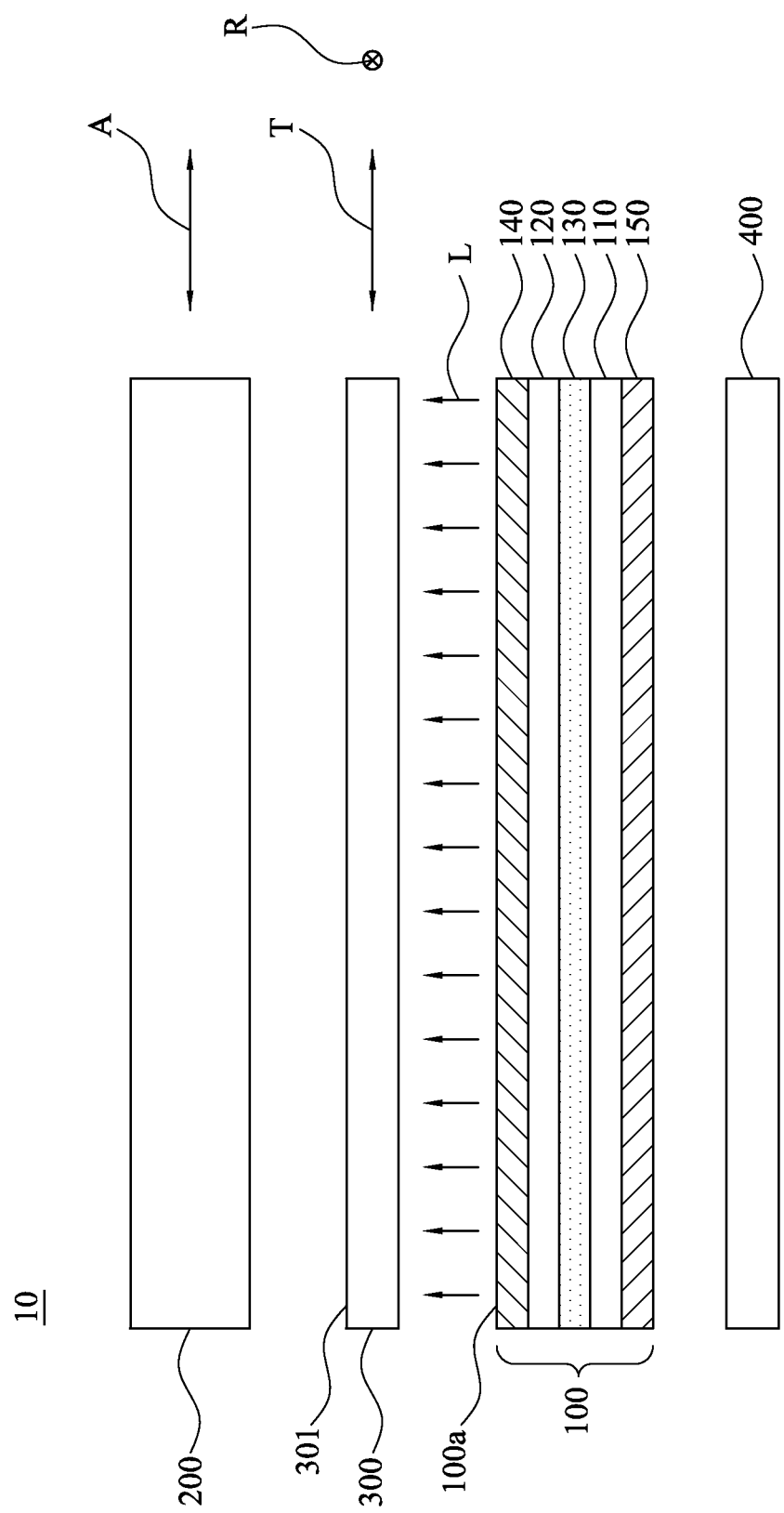
FIG. 1 is a schematic cross-section view of a display device switchable between a mirror mode and a display mode according to one embodiment of the present disclosure.

Reference will now be made in detail to the present embodiments of the present disclosure, examples of which are illustrated in the accompanying drawings. The example is not the only way to implement or utilize the present disclosure. The embodiments disclosed below may be combined or replaced each other in some better way. These combinations may not be described or explained further. Wherever possible, the same reference numbers are used in the drawings and the description to refer to the same or like parts.

Specific examples of components and arrangements are described below to simplify the present disclosure. These are, of course, merely examples and are not intended to be limiting. In order to simplify the drawing, some well-known structure and device may be illustrated in the Figures schematically.

One aspect of the present disclosure is to provide a display device switchable between a mirror mode and a display mode. In specifics, the display device has two operation modes, that is, the mirror mode and the display mode. In the display mode, the display device may display a predetermined image, video or information. In the mirror mode, the display device may reflect the ambient light and function as a mirror. More importantly, the display area may be configured into a plurality of display regions as required so that some display regions are in the mirror mode and other display regions are in the display mode. It will be described below more detail.

FIG. 1 is a schematic cross-section view of the display device 10 switchable between a mirror mode and a display mode according to one embodiment of the present disclosure. The display device 10 includes a display panel 100, a polarizing element 200 and a reflective polarizer 300.

The display panel 100 has a light-emitting surface 100a. The display panel 100 may emit light L from the light-emitting surface 100a. The display panel 100 may be a self-luminous display panel or a non-self-luminous display panel. In the embodiment where the display panel is non-self-luminous, a light source may be provided by, for example, a backlight module. For instance, the display panel 100 may be a liquid crystal display, an organic light emitting diode panel, an electroluminescent display panel or others. In following description, a liquid crystal display panel is taken as an example to illustrate the display panel 100 so that one skilled in the art may implement the present disclosure. It should be noted that other types of display panels may be utilized in the embodiments of the present disclosure.

In the embodiment where the display panel 100 is a liquid crystal display panel, the display panel 100 includes an active array substrate 110, a color filter 120, a liquid crystal layer 130, an upper polarizer 140 and a bottom polarizer 150. The liquid crystal layer 130 is disposed between the active array substrate 110 and the color filter 120. The upper polarizer 140 and the bottom polarizer 150 are disposed on the outer surfaces of the color filter 120 and the active array substrate 110, respectively. Furthermore, a backlight module 400 is arranged at the side of the bottom polarizer 150.

After the light emitted by the backlight module 400 passes through the liquid crystal display panel, the light is transformed to linearly polarized light and projects to the reflective polarizer 300 and the polarizing element 200.

The polarizing element 200 is disposed at the side of a light-emitting surface 100a of the display panel 100 and the polarizing element 200 has a switchable polarizing mode and non-polarizing mode. That is, the polarizing element 200 is switchable between a polarizing mode and a non-polarizing mode. The polarizing element 200 has an absorption axis A. When the polarizing element 200 is operated in the polarizing mode, the polarizing element 200 absorbs polarized light in a direction parallel with the absorption axis A. When the polarizing element 200 is operated in the non-polarizing mode, the polarizing element 200 may allow the polarized light emitted from the display panel 100 (for example, linearly polarized light) to pass there through. In practice, the direction of the absorption axis A of the polarizing element 200 may be changed so that the polarizing element 200 may be operated in the polarizing mode and the non-polarizing mode. The implementation and operation principle of the polarizing element 200 will be described more detail hereinafter.

As shown in FIG. 1, the reflective polarizer 300 is disposed between the display panel 100 and polarizing element 200. The reflective polarizer 300 has a reflection axis R and a transmission axis T. In one embodiment, the reflection axis R is substantially perpendicular to the transmission axis T. The reflection axis R and the transmission axis T are substantially parallel with a principal surface 301 of the reflective polarizer 300. The reflective polarizer 300 may reflect a part of the incident light and allow the other part of the incident light to transmit. In particular, the reflective polarizer 300 may reflect the incident light which the direction of the electric field is parallel with the reflection axis R, and allow the incident light which the direction of the electric field is parallel with the transmission axis T to transmit the reflective polarizer 300. In the embodiments where the liquid crystal display panel is used as the display panel 100, the transmission axis T of the reflective polarizer 300 is preferably parallel with the transmission axis of the upper polarizer 140.

Figure 2B:
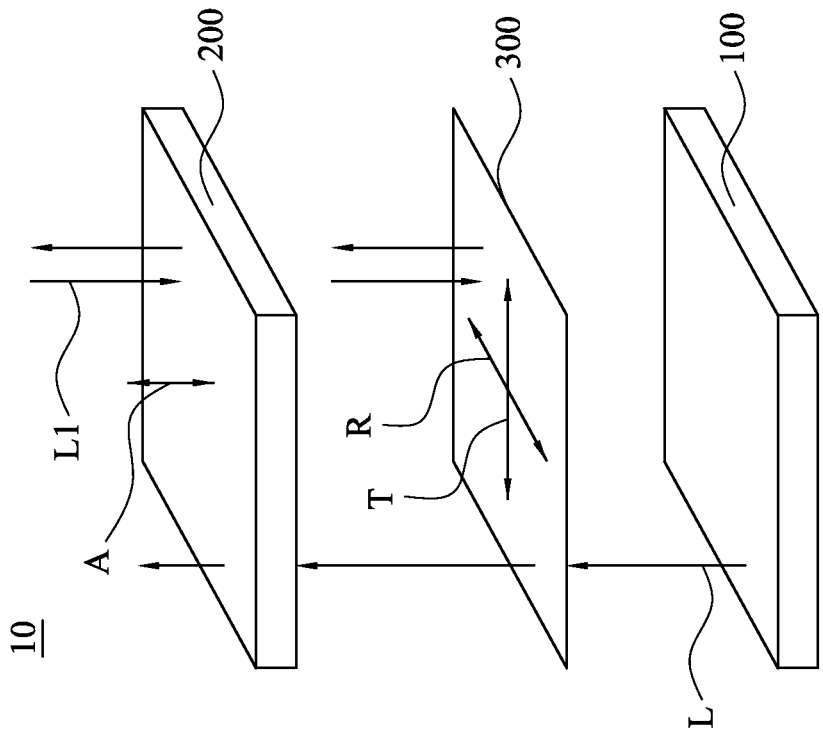
FIG. 2B is a schematic view of the light path of the display device with the polarizing element being in the non-polarizing mode according to one embodiment of the present disclosure.
Figure 2A:
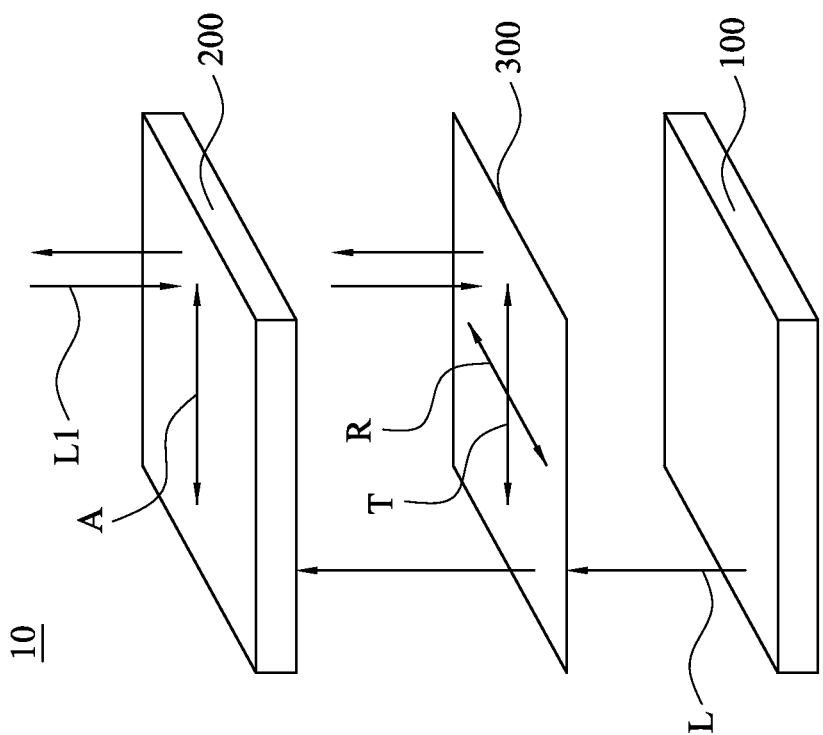
FIG. 2A is a schematic view of the light path of the display device with the polarizing element being in the polarizing mode according to one embodiment of the present disclosure.

FIG. 2A is a schematic view illustrating the light path of the display device 10 when the polarizing element 200 is in the polarizing mode, according to one embodiment of the present disclosure. When the polarizing element 200 is operated in the polarizing mode, the absorption axis A of the polarizing element 200 is substantially parallel with the light-emitting surface 100a of the display panel 100. In one embodiment, the absorption axis A of the polarizing element 200 is substantially parallel with the transmission axis T of the reflective polarizer 300. Therefore, after the light L emitted from the display panel 100 passes through the reflective polarizer 300, the light L is transformed to linearly polarized light and the polarizing direction thereof is parallel with the transmission axis T. Furthermore, the absorption axis A of the polarizing element 200 is substantially parallel with the transmission axis T, so that the polarizing element 200 absorbs the light from the reflective polarizer 300, and therefore the polarizing element 200 blocks the light L from the display panel 100 to pass through the polarizing element 200. On the other hand, when the ambient light L1 passes through the polarizing element 200, the polarizing element 200 may absorb the part of the ambient light L1 which has a polarizing direction parallel with the absorption axis A, and allow the part of the ambient light L1 which has a polarizing direction perpendicular to the absorption axis A to transmit. Accordingly, when ambient light passes through the polarizing element 200, it is transformed into linearly polarized light, and the polarizing direction thereof is substantially parallel with the reflection axis R of the reflective polarizer 300. Therefore, after ambient light passes through the polarizing element 200, it may be reflected by the reflective polarizer 300 so that the display device 10 presents the mirror mode.

FIG. 2B is a schematic view illustrating the light path of the display device 10 when the polarizing element 200 is in the non-polarizing mode, according to one embodiment of the present disclosure. When the polarizing element 200 is operated in the non-polarizing mode, the absorption axis A of the polarizing element 200 is not parallel with the transmission axis T of the reflective polarizer 300. For example, the absorption axis A of the polarizing element 200 is substantially perpendicular to the light-emitting surface 100a of the display panel 100. After the light L emitted from the display panel 100 passes through the reflective polarizer 300, because the absorption axis A of the polarizing element 200 is substantially perpendicular to the light-emitting surface 100a of the display panel 100, the polarizing element 200 does not block the light from the reflective polarizer 300. Therefore, the light L emitted from the display panel 100 may transmit the reflective polarizer 300 and the polarizing element 200 so that the display device 10 presents the display mode. Besides, even the ambient light L1 may pass through the polarizing element 200 and be reflected by the reflective polarizer 300, the intensity of the reflected ambient light is much less than that of the light emitted from the display panel 100. Thus, the display device 10 presents the display mode.

Figure 3A:
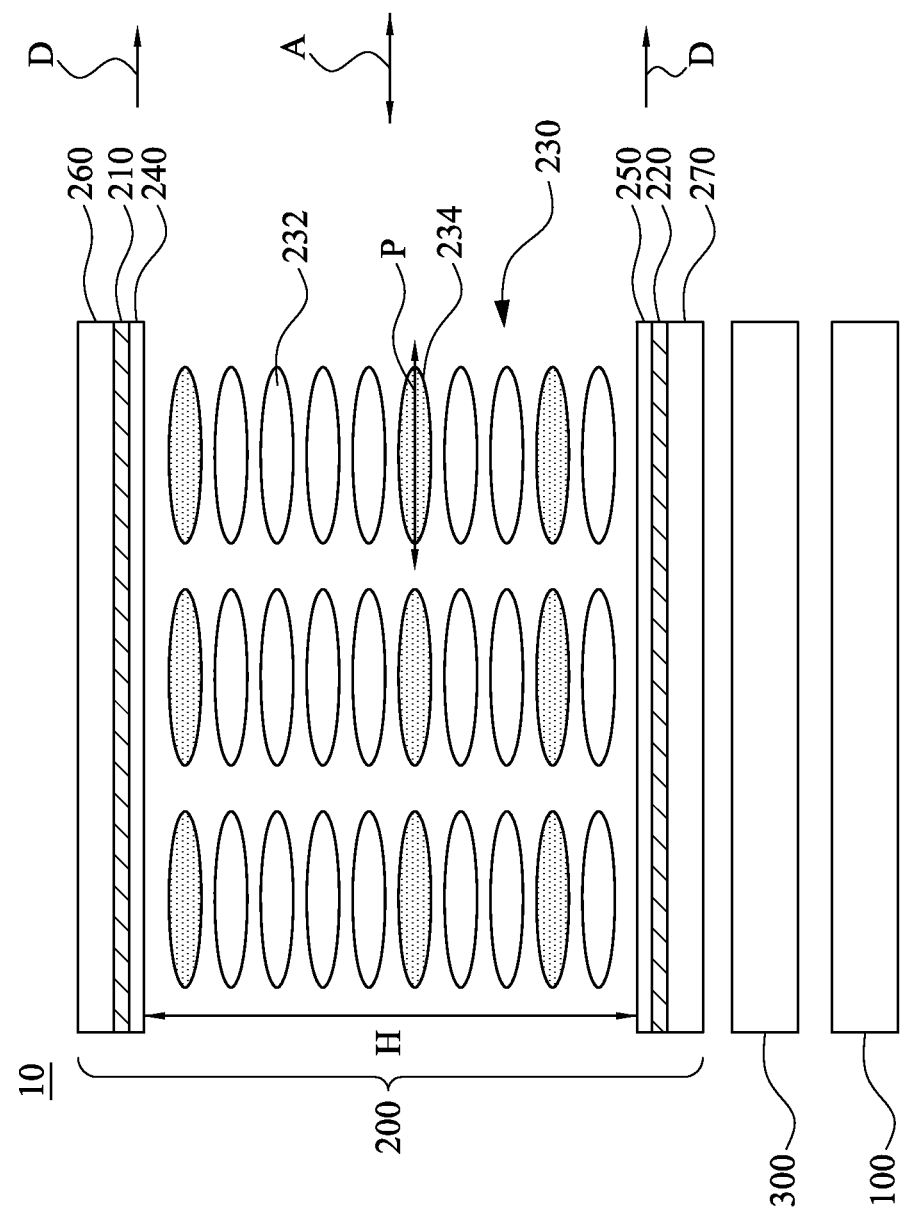
FIG. 3A is a schematic cross-section view of a display device with the polarizing element being in the polarizing mode according to one embodiment of the present disclosure.

FIG. 3A is a schematic cross-section view illustrating the display device 10 with the polarizing element 200 operated in the polarizing mode, according to one embodiment of the present disclosure. As shown in FIG. 3A, the polarizing element 200 includes a first transparent electrode 210, a second transparent electrode 220, a polarizing layer 230, a first substrate 260 and a second substrate 270. The first transparent electrode 210 and the second transparent electrode 220 are respectively disposed on the first substrate 260 and the second substrate 27. The second transparent electrode 220 faces the first transparent electrode 210. The polarizing layer 230 is disposed between the first transparent electrode 210 and the second transparent electrode 220. In one embodiment, the polarizing layer 230 includes a liquid crystal material 232 and a dichroic dye 234. The dichroic dye 234 has a long axis P and the long axis P is substantially parallel with the inner surface of the first transparent electrode 210 (or the second transparent electrode 220) when the difference in electrical potential between the first transparent electrode 210 and the second transparent electrode 220 is approximately equal to zero. In this embodiment, the orientation or arrangement of the dichroic dye 234 substantially determines the direction of the absorption axis A of the polarizing element 200. Specifically, the absorption axis A of the polarizing element 200 is substantially parallel with the long axis P of the dichroic dye 234. Therefore, when the difference in electrical potential between the first transparent electrode 210 and the second transparent electrode 220 is approximately equal to zero, the polarizing element is operated in the polarizing mode. In another embodiment, the thickness H of the polarizing layer 230 is from about 2.5 micrometer to about 12 micrometer, and the weight percentage of the dichroic dye 234 in the polarizing layer 230 is from about 0.2% to about 3%. According to some embodiments of the present disclosure, when the thickness H of the polarizing layer 230 is less than 2.5 micrometer, the optical characteristics difference between the polarizing mode and the non-polarizing mode for the polarizing element 200 is not significant. For example, the transmissivity of visible light is not considerably different between the two modes. On the other hand, when the thickness H of the polarizing layer 230 is greater than about 12 micrometer, the driving voltage for the polarizing element 200 is too large, and is unfavorable to switch the two modes. Furthermore, when the weight percentage of the dichroic dye 234 in the polarizing layer 230 is less than about 0.2%, the dichroic dye 234 is difficult to work effectively as required. On the other hand, when the weight percentage of the dichroic dye 234 in the polarizing layer 230 is greater than 3%, the transmissivity of the polarizing layer is decreased to an unacceptable level.

Therefore, the thickness H of the polarizing layer 230 is preferably about 2.5 micrometer to about 12 micrometer, and more preferably from about 5 micrometer to 10 micrometer. The weight percentage of the dichroic dye 234 in the polarizing layer 230 is preferably about 0.2% to about 3%, and more preferably about 0.5% to about 2.9%.

In still another embodiment, as shown in FIG. 3A, the polarizing element 200 further includes the first alignment layer 240 and the second alignment layer 250. The first alignment layer 240 is disposed between the first transparent electrode 210 and the polarizing layer 230. The second alignment layer 250 is disposed between the second transparent electrode 220 and the polarizing layer 230. Moreover, the aligning direction D of the first alignment layer 240 is substantially the same as that of the second alignment layer 250. Thus, the liquid crystal material 232 and the dichroic dye 234 may be aligned in a certain orientation when no external electric field is applied thereto. Specifically, when there does not exist a significant difference in electrical potential between the first transparent electrode 210 and the second transparent electrode 220, the aligning direction D of the first alignment layer 240 and the second alignment layer 250 makes the long axis P of the dichroic dye 234 and the liquid crystal molecules in the liquid crystal material 232 substantially parallel with the aligning direction D. Accordingly, the aligning direction D is substantially parallel with the absorption axis A of the polarizing element 200.

Figure 3B:
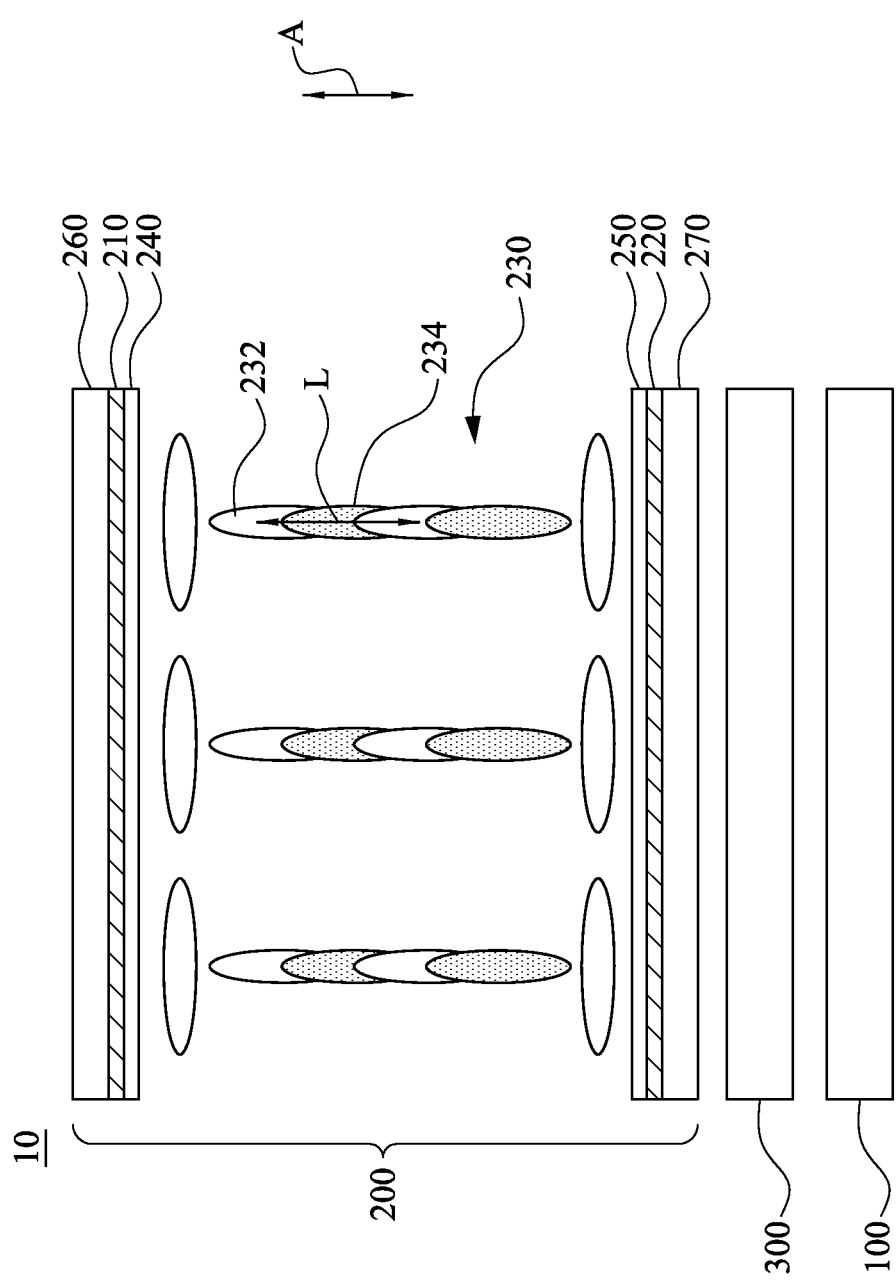
FIG. 3B is a schematic cross-section view of a display device with the polarizing element being in the non-polarizing mode according to one embodiment of the present disclosure.

To the contrary, as shown in FIG. 3B, when the electrical potential difference between the first transparent electrode 210 and the second transparent electrode 220 is not equal to zero, the polarizing element 200 is operated in the non-polarizing mode. Specifically, when the liquid crystal material 232 and the dichroic dye 234 are influenced by an external electric field, the orientation and arrangement thereof may be changed. For example, the long axis P of the dichroic dye 234 and that of the liquid crystal molecules may be changed to be substantially perpendicular to the inner surface of the first transparent electrode 210 (or the second transparent electrode 220). As mentioned above, the orientation and arrangement of the dichroic dye 234 substantially determines the direction of the absorption axis A of the polarizing element 200. Accordingly, the absorption axis A of the polarizing element 200 is changed to be substantially perpendicular to the inner surface of the first transparent electrode 210. That is, the absorption axis A of the polarizing element 200 is substantially perpendicular to the light-emitting surface 100a of the display panel 100.

Figure 4A:
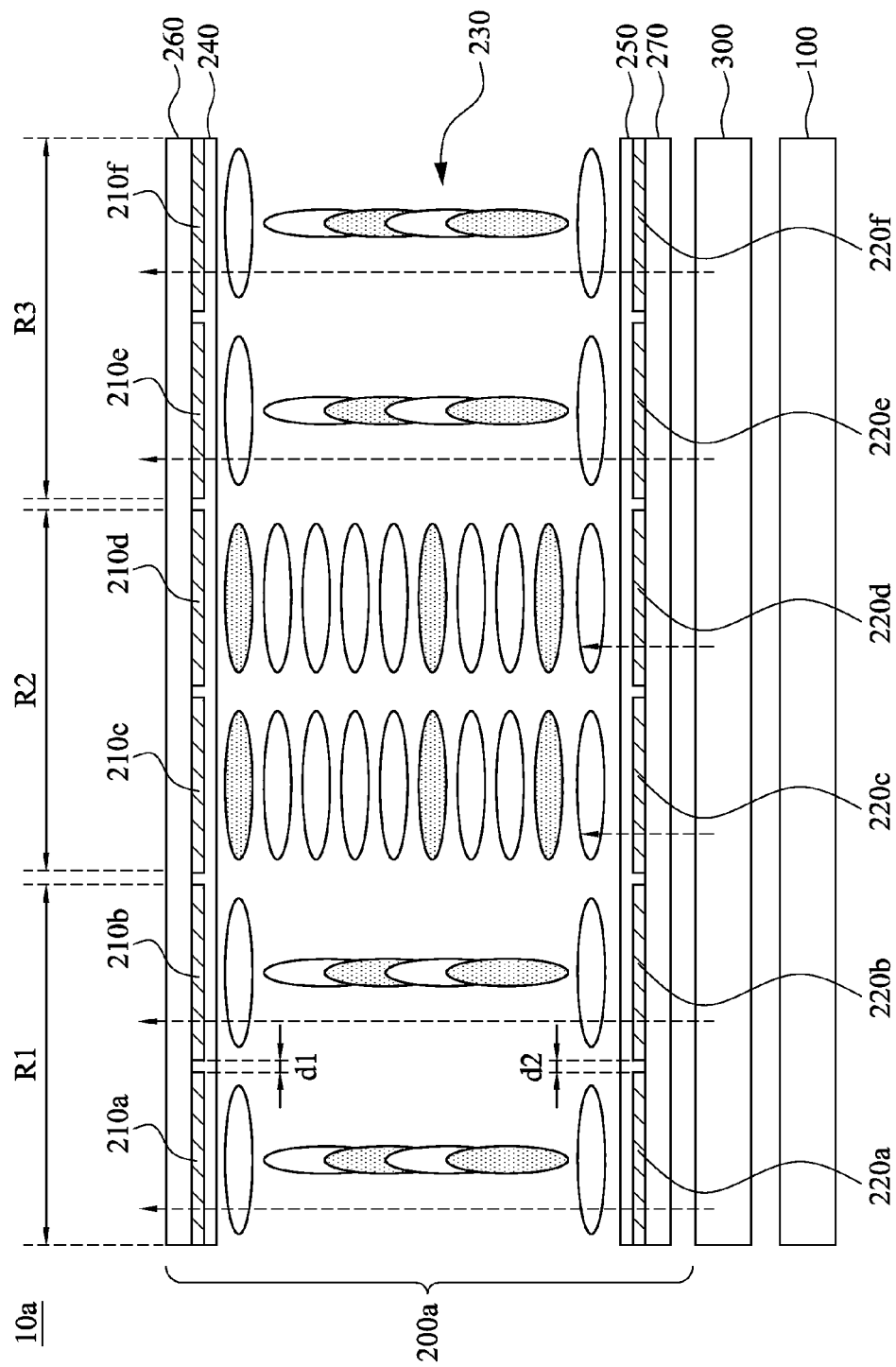
FIG. 4A is a schematic cross-section view of a display device switchable between a mirror mode and a display mode according to another embodiment of the present disclosure.

FIG. 4A is a schematic cross-section view illustrating a display device 10a switchable between a mirror mode and a display mode according to another embodiment of the present disclosure. The display device 10a includes a display panel 100, a polarizing element 200a and a reflective polarizer 300. The difference between the display device 10a of this embodiment and the display device 10 of the previous embodiment is the structure of polarizing element 200a. The structure, function and operation of the other elements (e.g. display panel 100 and the reflective polarizer 300) may be the same as those of any embodiment described hereinbefore.

The polarizing element 200a includes a plurality of first transparent electrodes 210a-210f, a plurality of second electrodes 220a-220f, a polarizing layer 230, a first alignment layer 240, a second alignment layer 250, a first substrate 260 and a second substrate 270. The first transparent electrodes 210a-210f are disposed on the first substrate 260 whereas the second electrodes 220a-220f are disposed on the second substrate 270. Each of the first transparent electrodes 210a-210f and each of the second transparent electrodes 220a-220f may independently provide an electrical potential. The first transparent electrodes 210a-210f are separated from each other by a distance d1 and the second transparent electrodes 220a-220f are separated from each other by a distance d2. Each of the first transparent electrodes 210a-210f is corresponding to one of the second transparent electrodes 220a-220f, respectively. Accordingly, the electrical potential of the first transparent electrodes 210a-210f and the second transparent electrodes 220a-220f may be independently controlled. Specifically, an electrical potential difference (not equal to zero) may be applied between the first transparent electrodes 210a, 210b and the second transparent electrodes 220a, 220b so that the first region R1 with the first transparent electrodes 210a, 210b and the second transparent electrodes 220a, 220b is in the non-polarizing mode. On the other hand, an electrical potential difference between the first transparent electrodes 210c, 210d and the second transparent electrodes 220c, 220d may be controlled to equal about zero so that the first region R2 with the first transparent electrodes 210c, 210d and the second transparent electrodes 220c, 220d is in the polarizing mode. Moreover, an electrical potential difference (not equal to zero) may be applied between the first transparent electrodes 210e, 210f and the second transparent electrodes 220e, 220f so that the third region R3 with the first transparent electrodes 210e, 210f and the second transparent electrodes 220e, 220f is in the non-polarizing mode. In other words, the first region R1 of the polarizing element 200a is in the non-polarizing mode, the second region R2 is in the polarizing mode and the third region R3 is in the non-polarizing mode. Therefore, the display device 10a in the first region R1 is operated in the display mode, the display device 10a in the second region R2 is operated in the mirror mode and the display device 10a in the third region R3 is operated in the display mode. In other words, the first transparent electrodes 210c, 210d and the second transparent electrodes 220c, 220d are configured such that a part of the polarizing element 200 is in the polarizing mode whereas the other part of the polarizing element 200 is in the non-polarizing mode. Accordingly, for the display device 10a, a portion of display area is in the mirror mode and another portion of the display area is in the display mode. The other elements of the polarizing element 200a, such as polarizing layer 230, the first alignment layer 240 and the second alignment layer 250 may be the same as those of any embodiment described hereinbefore.

Figure 4B:
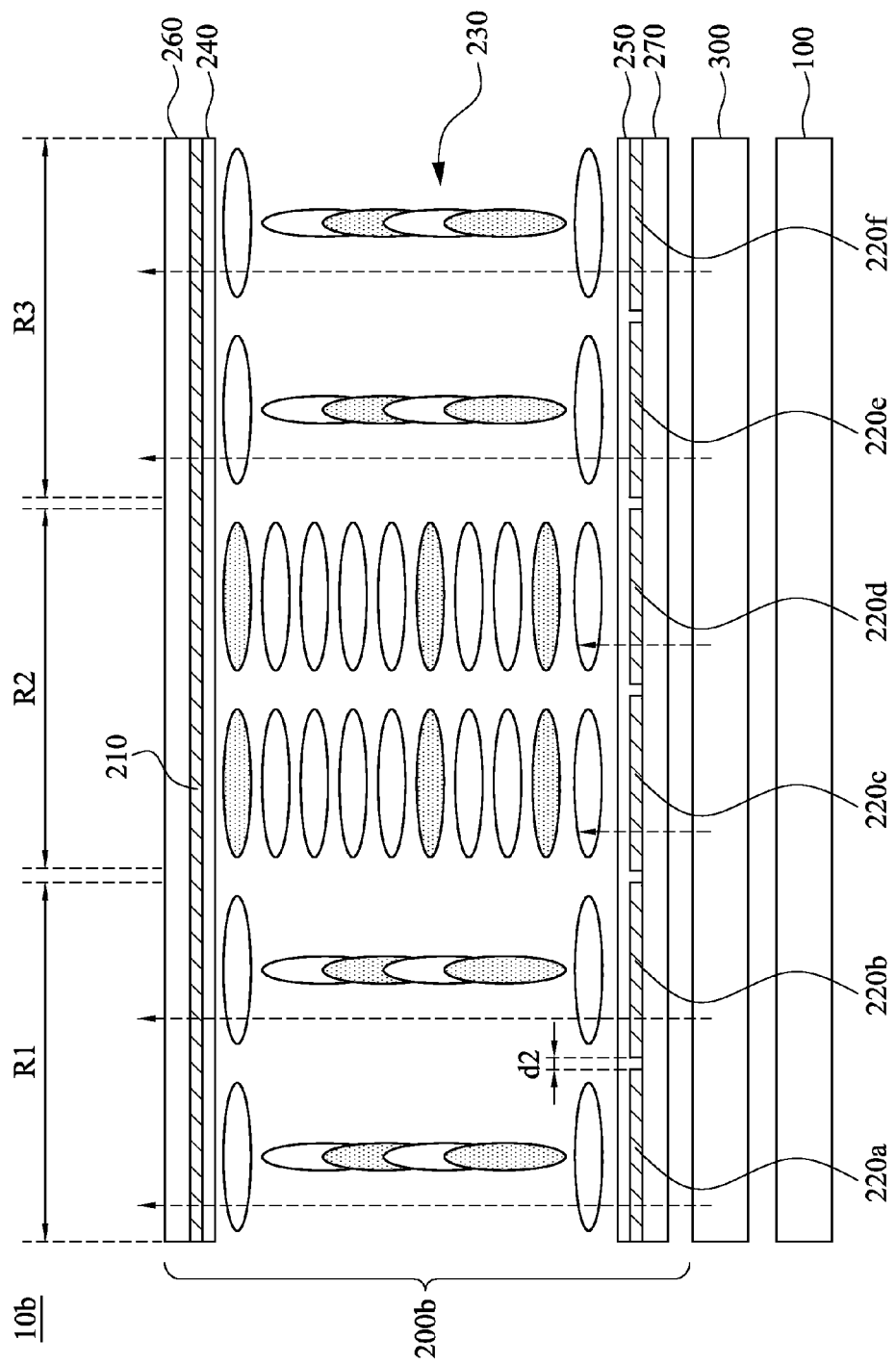
FIG. 4B is a schematic cross-section view of the display device switchable between a mirror mode and a display mode according to further another embodiment of the present disclosure.
Figure 4C:
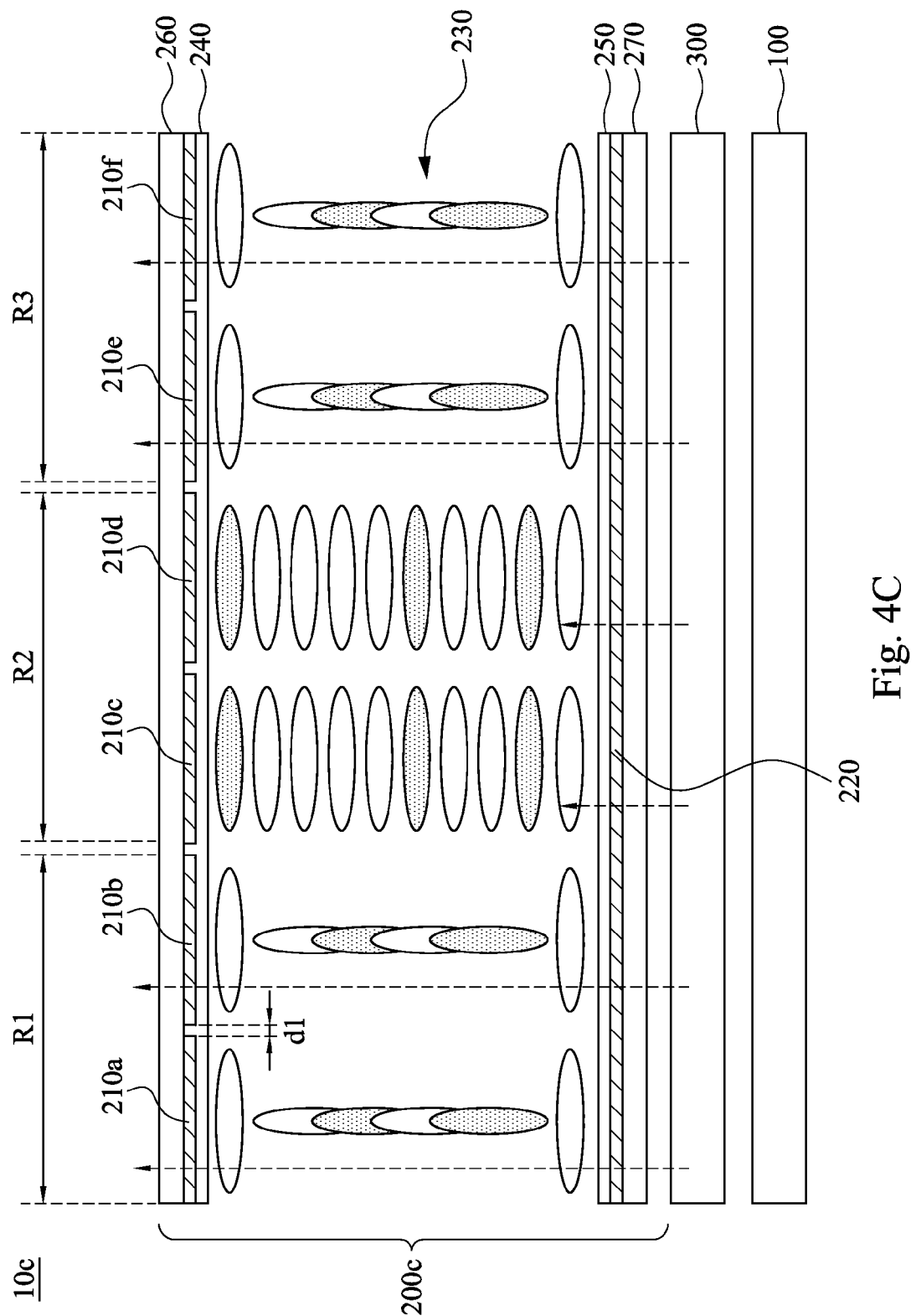
FIG. 4C is a schematic cross-section view of the display device switchable between a mirror mode and a display mode according to yet another embodiment of the present disclosure.

FIG. 4B is a schematic cross-section view illustrating a display device 10b switchable between a mirror mode and a display mode according to still another embodiment of the present disclosure. This embodiment is similar to the embodiment depicted in FIG. 4A, the difference therebetween is that the polarizing element 200b includes a single first transparent electrode 210 in a blanket form. The first transparent electrode 210 is extended to cover all display area of the display device 10b. The polarizing element 200b further includes a plurality of second electrodes 220a-220f separated from each other. Each of the second transparent electrodes 220a-220f may independently provide an electrical potential. By applying different voltages to the second transparent electrodes 220a-220f, the user may control the polarizing status of a partial area of the polarizing element 200b as required. In other embodiment, as shown in FIG. 4C, the polarizing element 200c includes a single second transparent electrode 220 in a blanket form. The second transparent electrode 220 is extended to cover all display area of the display device 10c. The polarizing element 200c further includes a plurality of first electrodes 210a-210f separated from each other. Each of the first transparent electrodes 210a-210f may independently provide an electrical potential. By applying different voltages to the first transparent electrodes 220a-220f, the user may control the polarizing status of a partial area of the polarizing element 200c as required.

Figure 5:
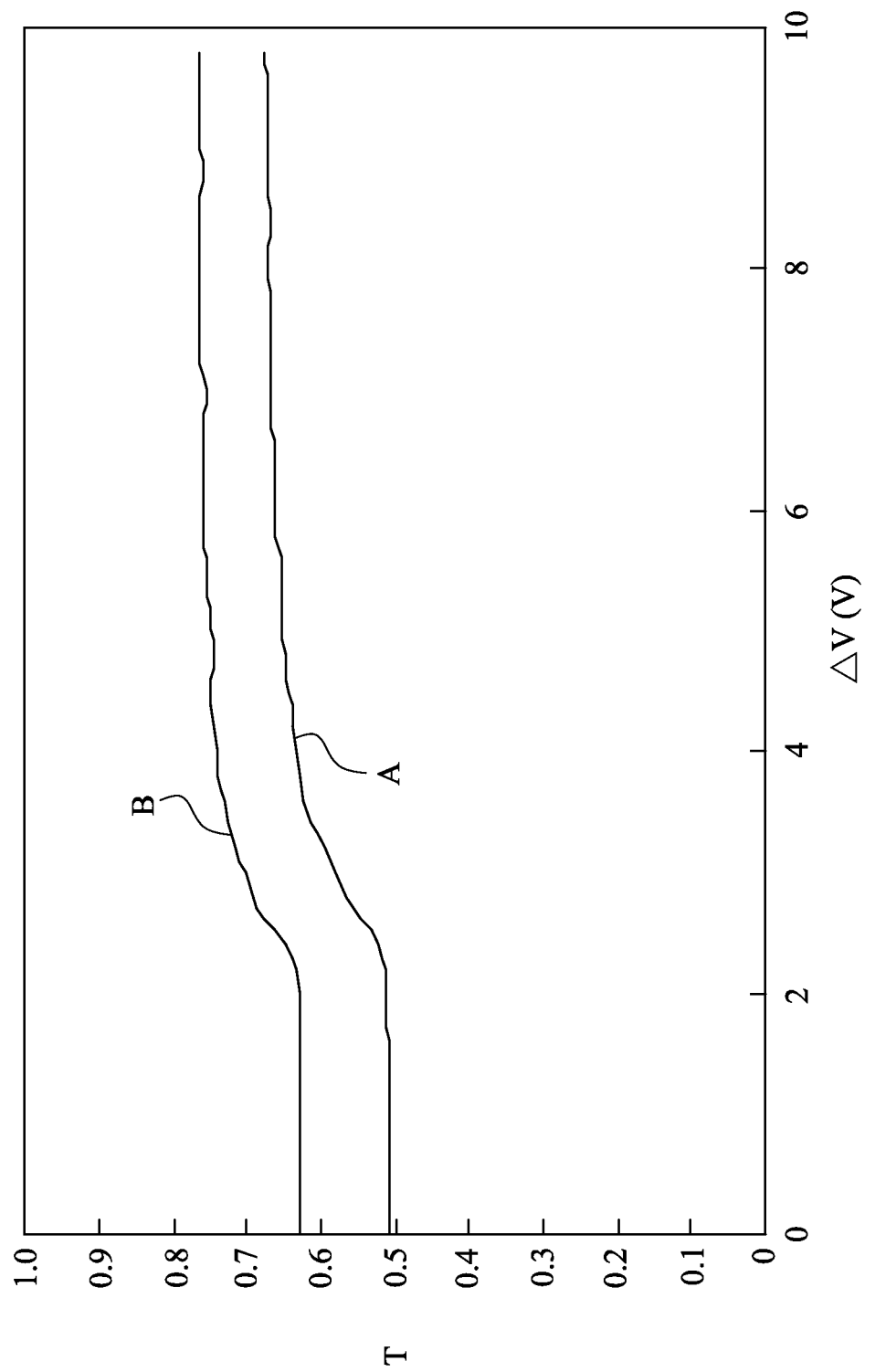
FIG. 5 is a diagram showing the relationship between the transmissivity (T) and the electrical potential (V) for the polarizing element according to another embodiment of the present disclosure.

FIG. 5 is a diagram showing the relationship between the transmissivity (T) and the electrical potential difference (AV) of the polarizing element, according to two examples of the present disclosure. The transmissivity (T) is normalized, that is, the maximum value of the transmissivity is 1. The electrical potential difference (AV) is the voltage difference between the first transparent electrode 210 and the second transparent electrode 220. In FIG. 5, the curve A represents the example in which the thickness of the polarizing layer is 10 micrometer and the weight percentage of the dichroic dye in the polarizing layer is 1%. The curve B represents the example in which the thickness of the polarizing layer is 10 micrometer and the weight percentage of the dichroic dye in the polarizing layer is 0.5%. From curve A and curve B, when the electrical potential difference (AV) is less than 2.4V, the transmissivity of the polarizing element 200 is low and the polarizing element 200 is operated in the polarizing mode. When the differential electrical potential (V) is greater than 2.4V, the transmissivity of the polarizing element 200 is high and the polarizing element 200 is operated in the non-polarizing mode.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims and their equivalents.

What is claimed is:

1. A display device switchable between a mirror mode and a display mode, the display device comprising:
   a display panel having a light-emitting surface for emitting a polarized light;
   a polarizing element having an absorption axis and disposed on a side adjacent to the light-emitting surface, wherein the polarizing element is switchable between a polarizing mode and a non-polarizing mode, and when the polarizing element is operated in the polarizing mode, the polarizing element absorbs the polarized light from the display panel in a polarization direction parallel with the absorption axis, and wherein when the polarizing element is operated in the non-polarizing mode, the polarizing element allows the polarized light emitted from the display panel to pass through the polarizing element; and
   a reflective polarizer disposed between the display panel and the polarizing element.

2. The display device of claim 1, wherein when the polarizing element is operated in the polarizing mode, the display panel is in the mirror mode and wherein when the polarizing element is operated in the non-polarizing mode, the display panel is in the display mode.

3. The display device of claim 1, wherein the reflective polarizer has a reflection axis and a transmission axis, wherein when the polarizing element is operated in the polarizing mode, the absorption axis of the polarizing element is substantially parallel with the transmission axis of the reflective polarizer.

4. The display device of claim 1, wherein when the polarizing element is operated in the polarizing mode, the absorption axis of the polarizing element is substantially parallel with the light-emitting surface and wherein when the polarizing element is operated in the non-polarizing mode, the absorption axis of the polarizing element is substantially perpendicular to the light-emitting surface.

5. The display device of claim 1, wherein the polarizing element includes:
   at least one first transparent electrode;
   at least one second transparent electrode facing the first transparent electrode; and
   a polarizing layer disposed between the first transparent electrode and the second transparent electrode, wherein the polarizing layer includes a liquid crystal material and a dichroic dye.

6. The display device of claim 5, wherein the polarizing element further includes a first alignment layer and a second alignment layer, wherein the first alignment layer is disposed between the first transparent electrode and the polarizing layer, wherein the second alignment layer is disposed between the second transparent electrode and the polarizing layer, and wherein the first alignment layer and the second alignment layer has an identical aligning direction.

7. The display device of claim 6, wherein the aligning direction is substantially parallel with the absorption axis in the polarizing mode.

8. The display device of claim 5, wherein the at least one first transparent electrode is in plurality, and each of the first transparent electrodes is separated from one another by a distance, wherein each of the first transparent electrodes is configured to independently provide an electrical potential.

9. The display device of claim 5, wherein the at least one first transparent electrode is in plurality, and each of the first transparent electrodes is separated from one another, wherein the at least one second transparent electrode is in plurality, and each of the second transparent electrodes is separated from one another, wherein each of the first transparent electrodes is corresponding to one of the second transparent electrodes, and each of the first transparent electrodes and the second transparent electrodes is configured to independently provide an electrical potential.

10. The display device of claim 9, wherein the first transparent electrodes and the second transparent electrodes are configured in a way such that a portion of the polarizing element is in the polarizing mode and another portion of the polarizing element is in the non-polarizing mode.

11. The display device of claim 5, wherein when a difference in electrical potential between the first transparent electrode and the second transparent electrode is substantially equal to zero, the polarizing element is in the polarizing mode.

12. The display device of claim 5, wherein when a difference in electrical potential between the first transparent electrode and the second transparent electrode is not equal to about zero, the polarizing element is in the non-polarizing mode.

13. The display device of claim 5, wherein the dichroic dye has a long axis, and the long axis is substantially parallel with the absorption axis when the polarizing element is in the polarizing mode.

14. The display device of claim 5, wherein the dichroic dye has a long axis, and the long axis is substantially perpendicular to the first transparent electrode when the polarizing element is in the non-polarizing mode.

15. The display device of claim 5, wherein the polarizing layer has a thickness of about 2.5 micrometer to about 12 micrometer.

16. The display device of claim 15, wherein the polarizing layer has a thickness of about 5 micrometer to about 10 micrometer.

17. The display device of claim 5, wherein the dichroic dye is present in a weight percentage of about 0.2% to about 3% of the polarizing layer.

18. The display device of claim 17, wherein the dichroic dye is present in a weight percentage of about 0.5% to about 2.9% of the polarizing layer.

19. A display device switchable between a mirror mode and a display mode, the display device comprising:
- a display panel having a light-emitting surface;
- a polarizing element having an absorption axis and disposed on a side adjacent to the light-emitting surface, wherein the polarizing element is switchable between a polarizing mode and a non-polarizing mode, and when the polarizing element is operated in the polarizing mode, the polarizing element absorbs light emitted from the light-emitting surface, and the absorption axis of the polarizing element is substantially parallel with the light-emitting surface, and when the polarizing element is operated in the non-polarizing mode, light emitted from the light-emitting surface passes through the polarizing element, and the absorption axis of the polarizing element is substantially perpendicular to the light-emitting surface; and
- a reflective polarizer disposed between the display panel and the polarizing element.

* * * * *